Patented Jan. 29, 1935

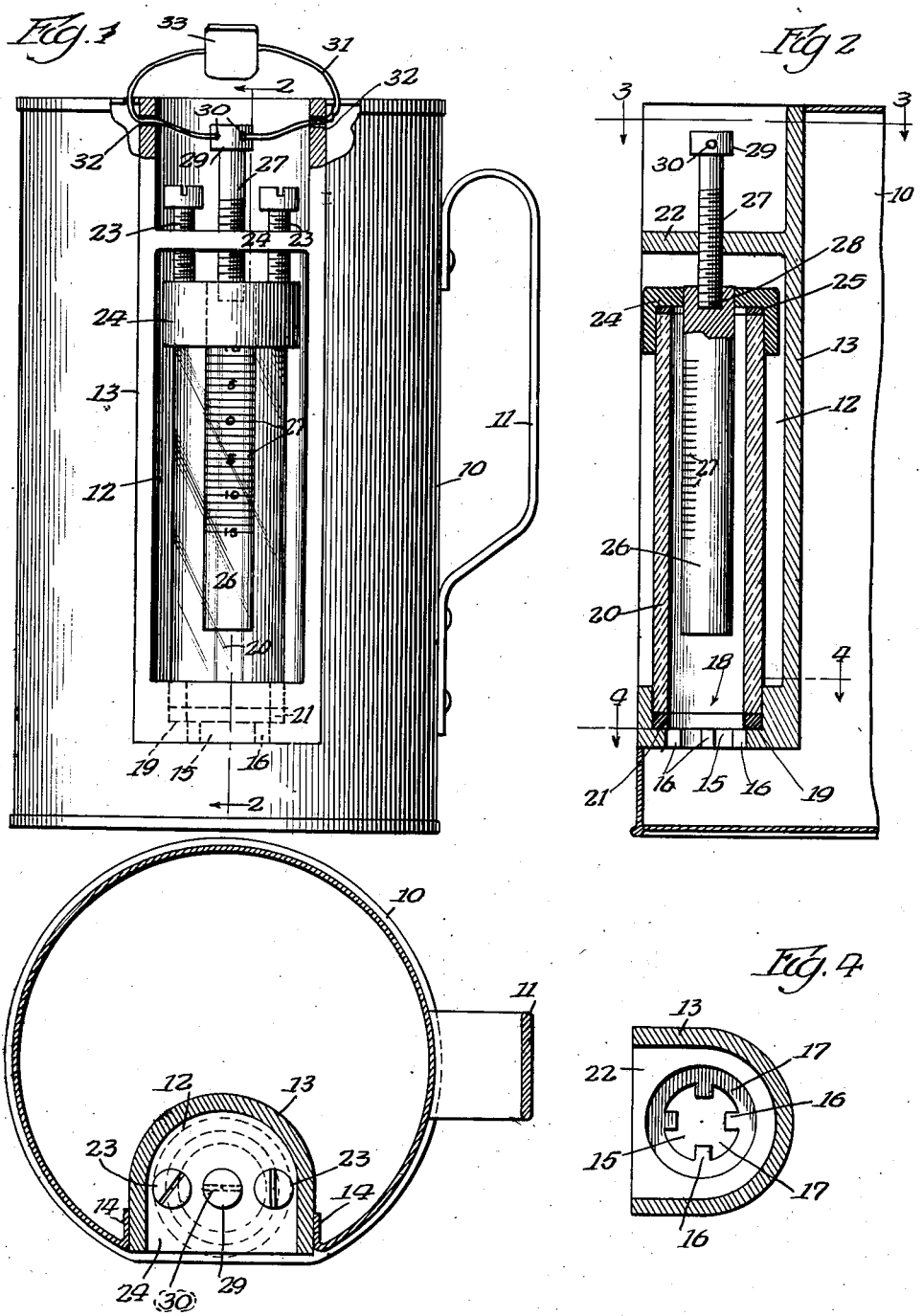

1,989,167

UNITED STATES PATENT OFFICE 1,989,167

GAUGE CAN OR RECEPTACLE

Henry A. Dohrmann, Chicago, Ill., assignor to Midland Specialties Company, Chicago, Ill., a corporation of Illinois Application January 6, 1931, Serial No. 506,871

6 Claims. (Cl. 73—166)

This invention relates to improvements in a gauge can or receptacle by means of the use of which there will be insured an accurate gauging or measuring of a predetermined quantity of liquid.

A further object is to provide in a device of this character improved means whereby the quantity of liquid to be measured or gauged may be varied within predetermined limits and at will.

It is well known that when liquids are placed in a receptacle or container the meniscus formed at the liquid level and adjacent the wall of the receptacle renders it almost impossible to accurately read the level of the liquid on the indicating gauge, with the result that the required quantity of liquid will not be accurately measured out. This is particularly true when the surface of the liquid is of a considerable area.

It is one of the objects of the present invention to provide improved means for breaking up or destroying the meniscus of liquids in devices of this character and thereby insure an absolutely accurate measurement of the predetermined quantity of the liquid.

A further object is to provide in a device of this character a gauge which is immersed in the liquid and improved means for adjusting the gauge for varying the quantity to be measured and improved means for securing the gauge in its adjusted position.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a front elevation of a gauge can of this character constructed in accordance with the principles of this invention.

Figure 2 is a sectional view as taken on line 2—2, Figure 1.

Figure 3 is a sectional view as taken on line 3—3, Figure 2.

Figure 4 is a sectional view taken on line 4—4, Figure 2.

Referring more particularly to the drawing the numeral 10 designates generally a can or receptacle which may be of any desired size and configuration and constructed of any suitable material, and is provided with a handle 11.

Opening through one side of the receptacle is a chamber which may be of any desired length and of any desired size, but is preferably of a length less than the height of the receptacle. This chamber designated by the reference numeral 12, may be formed in any desired or suitable manner either by forcing a portion of the wall of the receptacle inwardly or by means of a separate member 13 having an open side and which may be secured in position in any suitable manner such as by means of flanges 14 on the wall of the receptacle 10 and to which flanges the member 13 may be secured.

The bottom of the chamber 12 is provided with an opening 15 having inwardly projecting portions 16 spaced from each other and of a width to form spaces or passages 17 between adjacent projections 16.

The bottom of the member 13 is provided with an additional recess 18 of a diameter considerably greater than the diameter of the opening 15 so as to form a shoulder 19. One end of the gauge glass 20 is adapted to be inserted into the opening 18 to rest upon the shoulder 19 and a gasket or packing 21 may be interposed between the end of the gauge glass and the shoulder 19, the gasket being annular so as not to obstruct the opening 15 or the passage 17 between the projections 16.

The gauge glass 20 is of an external diameter considerably less than the diameter of the chamber 12, and arranged within the chamber and spaced from the top thereof is a partition 22 through which screws 23 are threaded and these screws engage a cap member 24 in the chamber 12, and which cap member extends over the upper end of the gauge glass 20, a gasket 25 being provided, if desired, between the upper extremity of the gauge glass 20 and the cap 24.

The screws 23 operating upon the cap 24 force the end of the gauge glass 20 against the packing 19 to form a liquid tight joint.

Within the gauge glass 20 is an indicator member 26 having graduations 27 thereon and the indicator member 26 is of an external diameter considerably less than the internal diameter of the gauge glass so that the liquid entering the gauge glass will encompass the indicator member 26.

The indicator member 26 is adapted to be adjusted lengthwise with respect to the gauge glass in any desired or suitable manner such as by means of a screw 27 threaded through the partition 22 and also threaded into the upper end of the indicator member 26 as at 28.

The screw 27 may be provided with any suitably shaped head 29 provided with one or more openings 30 extending transversely therethrough and the screw may be of any desired length, but preferably of a length so that it will not extend above the upper edge of the receptacle 10.

The gauge glass 20 has communication with the interior of the receptacle 10 through the opening 15 and passages 17 so that any liquid which is placed within the receptacle will find its level and a portion thereof will pass into the gauge glass.

In operation, the screw 27 is adjusted to position the indicator member 26 at the desired point so that the zero of the graduations 27 will be positioned at a predetermined or proper height from the bottom of the receptacle 10, after which the indicator member 26 may be locked or sealed against further adjustment in any desired or suitable manner, such as by means of a flexible member 31 threaded through openings 30 in the head 29 of the screw 27 and also through openings 32 in the wall of the chamber 12. The ends of the flexible member 31 may be brought together and fastened by means of a suitable seal 32, after which the member together with the seal may be folded together and inserted in the upper part of the chamber 12 above the partition 22.

It will therefore be manifest that after the indicator member 26 has been once adjusted and locked or secured in position it cannot be tampered with to further adjust the same without breaking the seal.

After the indicator member 26 has been adjusted the liquid is supplied to the can or receptacle 10, a portion thereof entering the gauge glass between the opening 15, and the projections 16 in the opening 15 serve to divide the liquid and thereby break up the area to prevent it from conforming entirely to the contour of the gauge glass and by so breaking up the liquid and by reason of the fact that the indicator member 26 projects into and is encompassed by the liquid, the meniscus of the liquid at the liquid level will be broken up and it will thereby be possible to accurately read upon the indicator member, the exact quantity of liquid within the receptacle. The graduations on either side of the zero graduations indicate a plus or minus quantity of the liquid.

By the adjustment of the indicator member 26 the positions of the graduations may be varied to vary or indicate the predetermined amount of liquid or quantity of liquid in the receptacle which it is desired to accurately measure.

It will also be manifest that with this construction the gauge glass 20 may be readily removed to permit the insertion of another glass in the event that one becomes broken.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A liquid test can comprising a container, a hollow transparent gauge glass communicating with the interior of the container, a closure for the end of the gauge glass, an indicator member disposed within and supported independently of said gauge glass, means to adjust the indicator member lengthwise of the gauge glass and through said closure, and a plurality of projections at and extending into the entrance of the said gauge glass and terminating short of each other and in proximity to the indicator member to divide the liquid as it flows into the gauge glass, there being graduations on said indicator member.

2. A liquid test can comprising a container, a hollow transparent gauge glass communicating with the interior of said container, a closure for the end of the gauge glass, an indicator member disposed within and supported independently of said gauge glass, means to adjust the indicator member lengthwise of the gauge glass and through the said closure, and a plurality of spaced obstructions extending into the inlet of the said gauge glass to break up the liquid flowing through said inlet, said obstructions being disposed in proximity to the indicator member, there being quantity graduations on said indicator member.

3. A liquid test can comprising a container having a compartment disposed inwardly and opening through the outer wall of and also the top of the container, a partition extending across the compartment and spaced from the top thereof, the bottom of the compartment being spaced above the bottom of said container, a transparent hollow gauge glass within said compartment resting upon the bottom thereof and terminating short of the said partition, there being an opening in the bottom of the compartment forming communication between the container and said gauge glass, a closure for the top of the gauge glass separate from and disposed below said partition, means independent of the gauge glass for securing said closure in position, an indicator member disposed within and supported independently of the gauge glass and of a diameter considerably less than the interior diameter of the gauge glass, and means adjustably connecting said indicator with said partition whereby the indicator may be longitudinally adjusted in the gauge glass, the said indicator being independent of and movable through said closure.

4. A liquid test can comprising a container having a compartment disposed inwardly and opening through the outer wall of and also the top of the container, a partition extending across the compartment and spaced for a substantial distance from the top thereof, the bottom of the compartment being spaced above the bottom of said container, a transparent hollow gauge glass within said compartment resting upon the bottom thereof and terminating short of the said partition, there being an opening in the bottom of the compartment forming communication between the container and said gauge glass, a closure for the top of the gauge glass separate from and disposed below said partition, means independent of the gauge glass for securing said closure in position, an indicator member disposed within the gauge glass and of a diameter considerably less than the interior diameter of the gauge glass, means independent of the gauge glass and adjustably connecting said indicator with said partition whereby the indicator may be longitudinally adjusted in the gauge glass, the said indicator being movable through said closure, and means for locking the indicator member in its adjusted position, the portion of the compartment above said partition adapted to receive and hold the said locking member.

5. A liquid test can comprising a container having a compartment disposed inwardly and opening through the outer wall of and also the top of the container, a partition extending across the compartment and spaced for a substantial distance from the top thereof, the bottom of the compartment being spaced above the bottom of said container, a transparent hollow gauge glass within said compartment and recessed into the bottom thereof, said gauge glass terminating short of the said partition, there being an opening through the bottom of the compartment forming communication between the container and the said gauge glass, a closure for the top of the gauge glass separate from and disposed below said partition, means independent of said gauge glass and adjustably connected with said partition for securing said closure in position, an indicator member disposed within the gauge glass and freely passing through said closure, said indicator being of a diameter considerably less than the interior diameter of the gauge glass, and means adjustably connecting said indicator with said partition whereby the indicator may be longitudinally adjusted within the gauge glass.

6. A liquid test can comprising a container having a compartment disposed inwardly and opening through the outer wall of and also through the top of the container, a partition extending across the compartment and spaced for a substantial distance from the top thereof, the bottom of the compartment being spaced above the bottom of the container, a transparent hollow gauge glass within said compartment resting upon the bottom thereof and terminating short of the said partition, there being an opening in the bottom of the compartment forming communication between the container and said gauge glass, a closure for the top of the gauge glass separate from and disposed below the said partition, means independent of the gauge glass for securing said closure in position, an indicator member disposed within the gauge glass and of a diameter considerably less than the interior diameter of the gauge glass, means independent of the gauge glass and adjustably connecting said indicator with said partition whereby the indicator may be longitudinally adjusted in the gauge glass, the said indicator being movable through said closure, and means within the compartment above the said container for adjusting the closure securing means.

HENRY A. DOHRMANN.